May 19, 1931.  A. C. ANDREASEN  1,805,476
COMBINATION HOSE END INDICATOR AND VALVE
Filed May 12, 1930  2 Sheets-Sheet 1
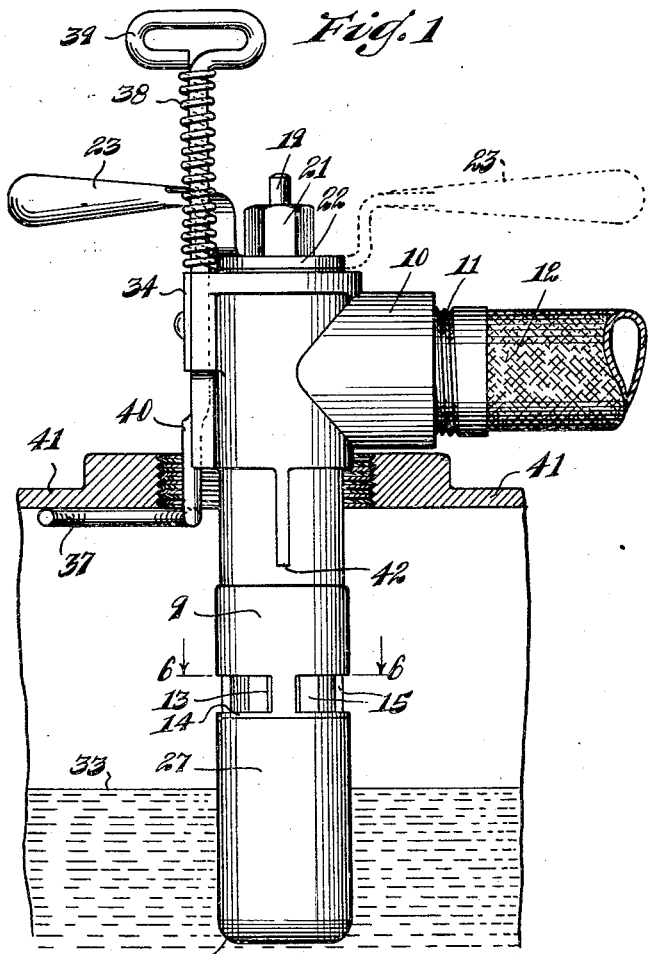
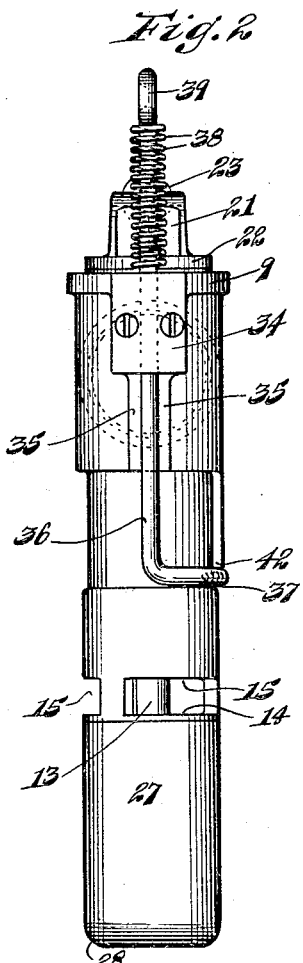
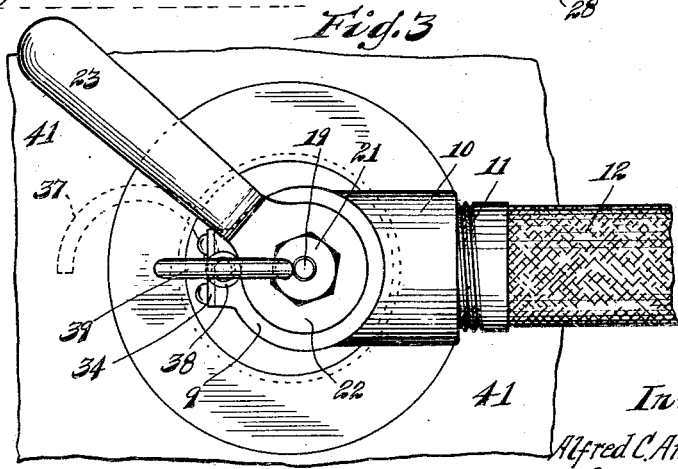
Inventor:
Alfred C. Andreasen,
By Joshua R. H. Potk
his Attorney.

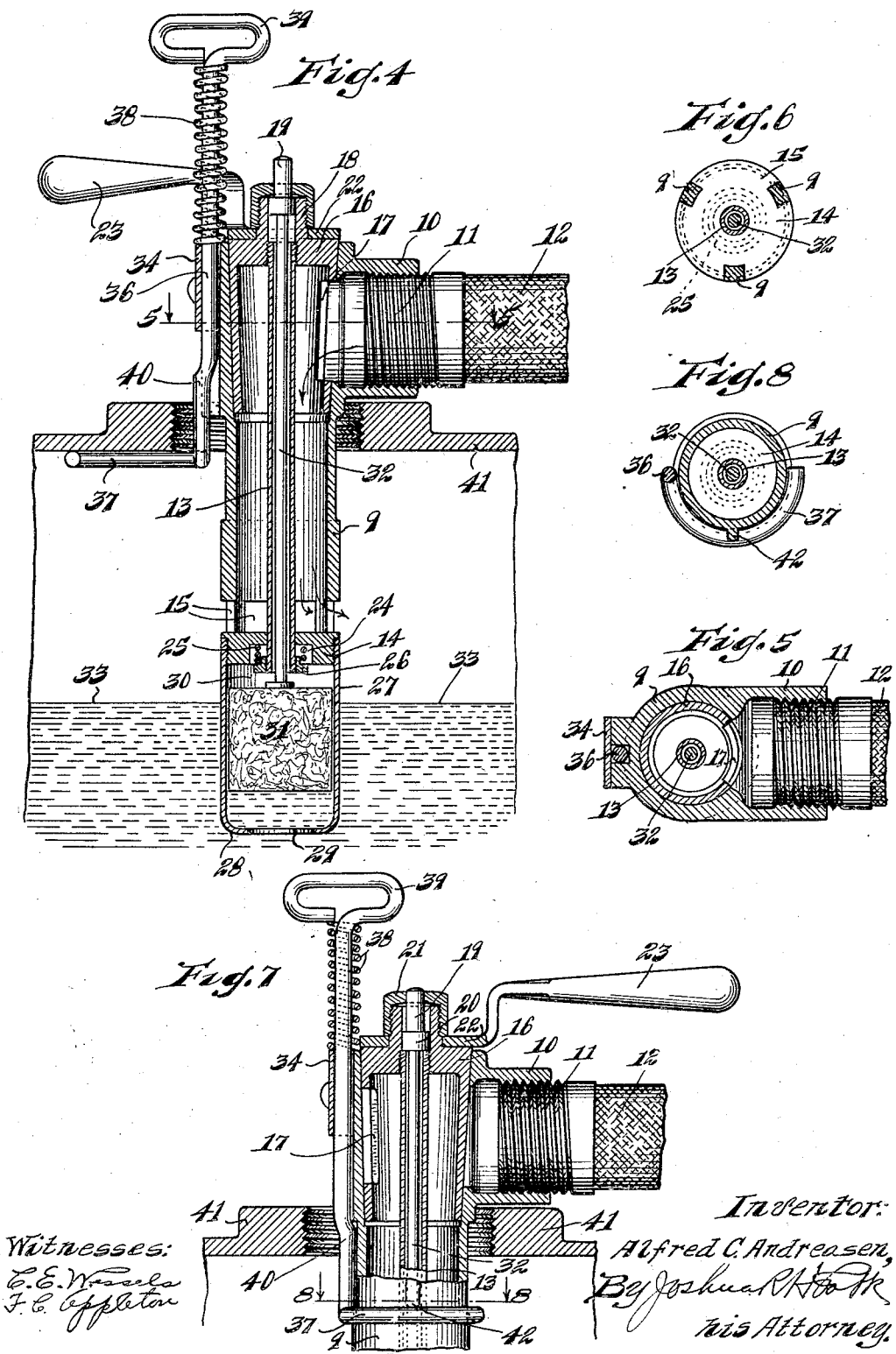

Patented May 19, 1931

1,805,476

UNITED STATES PATENT OFFICE

ALFRED C. ANDREASEN, OF OAK PARK, ILLINOIS, ASSIGNOR TO AIR-WAY PUMP COMPANY, OF CHICAGO, ILLINOIS, A CORPORATION OF ILLINOIS

COMBINATION HOSE END INDICATOR AND VALVE

Application filed May 12, 1930. Serial No. 451,695.

This invention relates to a combination hose indicator and valve incorporated in a device particularly designed to be secured to the discharge end of a liquid dispensing hose or conduit for insertion through the opening of a vessel to be filled or supplied with a liquid. An object of the invention is the provision of a device of this character adapted to visually indicate the level within the vessel of the liquid being supplied, in order that the operator may discontinue the supply before the vessel overflows, and a valve or shutoff means in the device. A further object is the provision of a device of the character indicated including, in combination, means for clamping the inner surface of the vessel for the purpose of maintaining the device properly extended within the interior of the vessel and in a vertical position. An additional object is the provision of a device of this nature durable in construction, inexpensive to manufacture, and positive, accurate, and convenient to operate.

The device is particularly adapted for use in connection with the hose or discharge conduit of a filling pump or tank in supplying gasoline or other liquid for use in internal combustion engines, especially in cases of tractors, trucks, etc., although it is to be understood that the device is not limited to such use or adaptation but is particularly efficient in indicating a liquid level at the time of approaching the capacity of the vessel by reason of its use and operation in direct contact with the liquid at the filling point, and because of the capability of shutting off the supply at the point of filling.

Other objects will appear hereinafter.

The invention consists in the combinations and arrangements of parts hereinafter described and claimed.

The invention will be best understood by reference to the accompanying drawings forming a part of this specification, and in which:

Fig. 1 is an elevational view of the device in operative position showing a portion of the liquid containing tank in secton;

Fig. 2 is an elevational view of the device detached, taken at right angles to Fig. 1;

Fig. 3 is a plan view of the device as shown in Fig. 1;

Fig. 4 is a vertical sectional view, partly in elevation, of the parts shown in Fig. 1;

Fig. 5 is a horizontal sectional view taken substantially on the line 5—5 of Fig. 4;

Fig. 6 is a horizontal sectional view taken substantially on the line 6—6 of Fig. 1;

Fig. 7 is a sectional view similar to Fig. 4 showing the upper portion of the device with the valve mechanism in closed position; and Fig. 8 is a sectional view taken substantially on the line 8—8 of Fig. 7.

As indicated in the drawings, the preferred embodiment of the device comprises a central cylindrical supporting housing 9 having an internally threaded elbow portion 10 adapted to receive for connection the threaded end 11 of a liquid discharge hose 12, the opposite end of which is connected to a filling pump or tank. Extending vertically within the member 9 is a tubular guide member 13 which is adapted to rotate centrally in the end portion 14 of member 9, and adjacent the upper surface of end 14 there is formed a plurality of discharge openings 15. As shown in Figs. 4 and 7, the upper portion of member 9 is tapered downwardly for the reception of a rotary tapered valve 16 provided with valve port 17. The upper extremity of guide member 13 is threaded for engagement with valve 16 as shown, and is adapted to rotate therewith, and valve 16 is also provided with an upwardly projecting boss 18 having a central opening for the reception of the indicator member 19 which, as shown, is provided with an enlarged head 20 and the reduced portion is adapted to extend through a central opening in cap 21 which is threaded upon the boss 18.

Secured to the upper portion of valve 16 is a washer 22 to which is affixed operating handle 23. As shown in Fig. 4 a central recess 24 is provided in the end 14 for the reception of a coil spring 25 adapted to bear against nut 26 threaded upon the lower extremity of the guide member 13. By this construction and arrangement, the spring 25 tends to maintain the valve 16 in seated frictional contact with the adjacent tapered portion of the housing member 9. A casing 27 is threaded upon the end 14 and has a lower inturned flange portion 28 and also a central opening 29 at the lower extremity, and provides a float chamber 30 within which is disposed float 31 which may be composed of cork or other buoyant material. A rod 32 is loosely mounted within the guide member 13 and is adapted to rest upon the float 31 with the opposite or upper end adjacent the indicator member 19. Thus, as the liquid 33 reaches the level shown in Fig. 4, the float is elevated from the lower portion of the chamber 30 and the indicator member 19 raised from the position shown in Fig. 7 to that shown in Fig. 4, warning the operator that the receptacle is nearly filled to capacity. To render the indicator member 19 more conspicuous, the surface may be colored red if desired.

Preferably secured to the side of member 9, opposite the elbow 10, is a clamp engaging plate 34 mounted upon two slightly spaced guide portions 35 to provide a vertical opening for the slidable engagement of rod 36, the lower end of which has a curved offset arm 37. A compression spring 38 is preferably disposed upon rod 36 between plate 34 and the handle 39 of rod 36 for the purpose of normally urging the clamping member and the clamping arm 37 upwardly. Rod 36 is preferably provided with a shoulder portion 40 which is adapted to maintain the arm 37 in clamping position as shown in Fig. 1, when the shoulder portion 40 is disposed between the guide portions 35.

Upon introduction of the device through the filling opening of a liquid receiving vessel or tank 41, as shown, arm 37 is swung to the position shown in Fig. 2, in engagement with lug 42. After insertion the arm is swung outwardly by means of handle 39 whereby it engages the inner surface of the tank and clamps the device in position. The valve 16 is then turned by means of handle 23 to the open position shown in Fig. 4, and the liquid travels through conduit 12, the passageway between guide member 13, and housing 9, and through the openings 15 for discharge into the tank. When the liquid has reached a level to cause the elevation of the indicator member 19, as described, the valve 16 is closed by swinging handle 23 to the position shown in Figs. 3 and 7. The lateral disposition of the discharge openings 15 is such that the liquid is spread outwardly in discharge into the tank and thus does not interfere with the proper registration of the liquid level or operation of the float.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. A device of the character described adapted to be secured to the discharge end of a liquid dispensing conduit, comprising a supporting member provided with a liquid passageway, a portion of said device adapted to extend interiorly of a liquid receiving vessel, means operable by the liquid within said vessel for visually indicating the upper level of said liquid, valve means for controlling the supply of liquid, and means for clamping said device to said vessel.

2. A device of the character described adapted to be secured to the discharge end of a liquid dispensing conduit, comprising a housing provided with a liquid passageway, a casing providing a float chamber, a float in said chamber, means operable by said float for visually indicating the relative elevation of said float, and a manually operated valve for controlling the supply of liquid.

3. A device of the character described adapted to be secured to the discharge end of a liquid dispensing conduit, comprising a housing provided with a liquid passageway, a casing providing a float chamber, a float in said chamber, means operable by said float for visually indicating the relative elevations of said float, a manually operated valve for controlling the supply of liquid, and means for clamping said device to a vessel being supplied with liquid.

4. A device of the character described adapted to be secured to the discharge end of a liquid dispensing conduit, comprising a housing, a central guide member, a casing providing a float chamber, a float in said chamber, a rod in said guide member and adapted to rest upon said float, and a manually operated valve for controlling the liquid supply.

5. A device of the character described adapted to be secured to the discharge end of a liquid dispensing conduit, comprising a housing, a central guide member, a casing providing a float chamber, a float in said chamber, a rod in said guide member and adapted to rest upon said float, a manually operated valve for controlling the liquid supply, and means for clamping said device to a vessel during a filling operation.

6. A device of the character described adapted to be secured to the discharge end of a liquid dispensing conduit, comprising a housing, a central guide member, a casing providing a float chamber, a float in said chamber, a rod in said guide member and adapted to rest upon said float, an indicator member operable by said rod, and a manually operated valve for controlling the liquid supply.

7. A device of the character described adapted to be secured to the discharge end of a liquid dispensing conduit, comprising a housing, a central guide member, a casing providing a float chamber, a float in said chamber, a rod in said guide member and adapted to rest upon said float, an indicator member operable by said rod, a manually operated valve for controlling the liquid supply, and means for clamping said device to a vessel during a filling operation.

In testimony whereof I have signed my name to this specification.

ALFRED C. ANDREASEN.